United States Patent

[11] 3,574,328

[72] Inventor William E. Holmes
Birmingham, Mich.
[21] Appl. No. 816,912
[22] Filed Apr. 17, 1969
[45] Patented Apr. 13, 1971
[73] Assignee Burroughs Corporation
Detroit, Mich.

[54] DOCUMENT TRANSPORT SYSTEM
3 Claims, 11 Drawing Figs.

[52] U.S. Cl. .......... 209/74, 209/111.8
[51] Int. Cl. .......... B07c 5/344
[50] Field of Search .......... 209/73, 74, 75, 111.7, 111.8

[56] References Cited
UNITED STATES PATENTS

| | | | |
|---|---|---|---|
| 2,990,965 | 7/1961 | Small et al. | 209/74 |
| 3,141,540 | 7/1964 | Burkhardt | 209/74X |
| 3,270,882 | 9/1966 | Perotto | 209/74 |
| 3,352,417 | 11/1967 | Cutaia | 209/74 |
| 3,368,672 | 2/1968 | Heaney et al. | 209/74X |
| 3,460,673 | 8/1969 | Sanner | 209/74X |

*Primary Examiner*—Allen N. Knowles
*Attorney*—Russel C. Wells

ABSTRACT: A document transport system embodying a main guideway for singly conveying documents to one of a plurality of gated intersecting auxiliary guideways is disclosed. The destination of the document is read from the document by a reader such as a magnetic reading head. This information is then synchronously transferred through a plurality of registers with the movement of the document along the main guideway. Positioned along the main guideway and anteriorly to each intersecting guideway is a document detector having the functions of transferring the information from the previous register to the present register and actuate the gate to the auxiliary guideway if there is a verification between the destination information in the register and the gate identification. Several documents having different destinations may be transported along the main guideway at any one time.

PATENTED APR 13 1971

3,574,328

SHEET 1 OF 2

INVENTOR.

WILLIAM E. HOLMES.

BY

Russel C. Wells.

ATTORNEY.

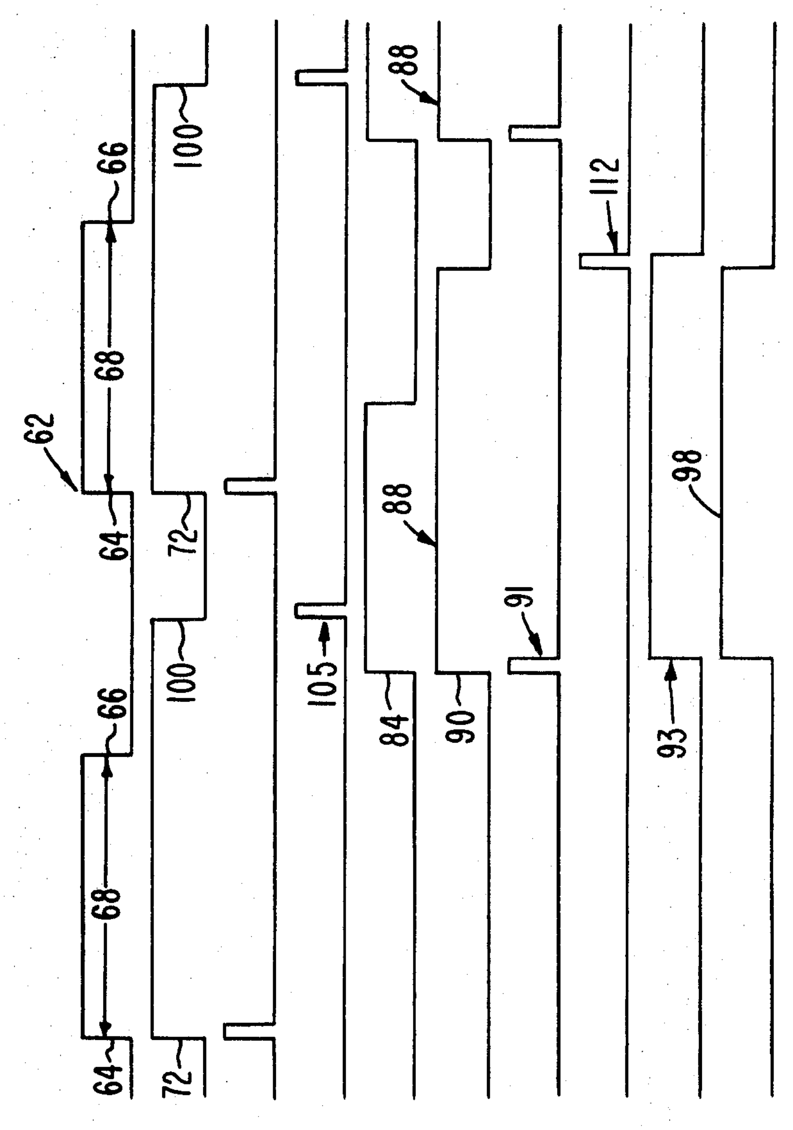
Fig. 2. POINT A, Fig. 3. POINT B, Fig. 4. POINT C, Fig. 5. POINT D, Fig. 6. POINT E, Fig. 7. POINT F, Fig. 8. POINT H, Fig. 9. POINT J, Fig. 10. POINT K, Fig. 11. POINT L

DOCUMENT TRANSPORT SYSTEM

BACKGROUND OF INVENTION

This invention relates to a document transport system for sorting singly conveyed documents. Particularly the invention relates to an electronic control system synchronizing the movement of the document with the electronic transfer of the destination information.

PRIOR ART

Prior art document transport systems such as used in high-speed sorting systems, have a plurality of guideways extending from one common location to one of a plurality of individual storage hoppers. In such a system, the destination storage hopper is determined and the correct guideway is then selected with each document traveling along a unique path to the hopper.

In the present invention, the duplication of transport guideways is eliminated without decreasing the rate of sorting. Therefore, the principal object of the invention is to maintain the transport rate of documents being transported and selectively sorted without having a plurality of transport guideways.

SUMMARY OF THE INVENTION

A document transport system for singly and successively transporting and sorting a plurality of documents from a single transport guideway. A plurality of document detectors are spaced apart along the main guideway and respectively positioned anteriorly to each of one of a plurality of deflecting gates. The document detectors are individually and electrically connected to one of a plurality of serially connected registers and in conjunction therewith actuate a deflecting gate upon verification between the information in the register and the identity of the gate.

DESCRIPTION OF THE DRAWINGS

FIG. 2 through FIG. 11 are timing diagrams of the system of FIG. 1.

DETAILED DESCRIPTION

Figure 1:
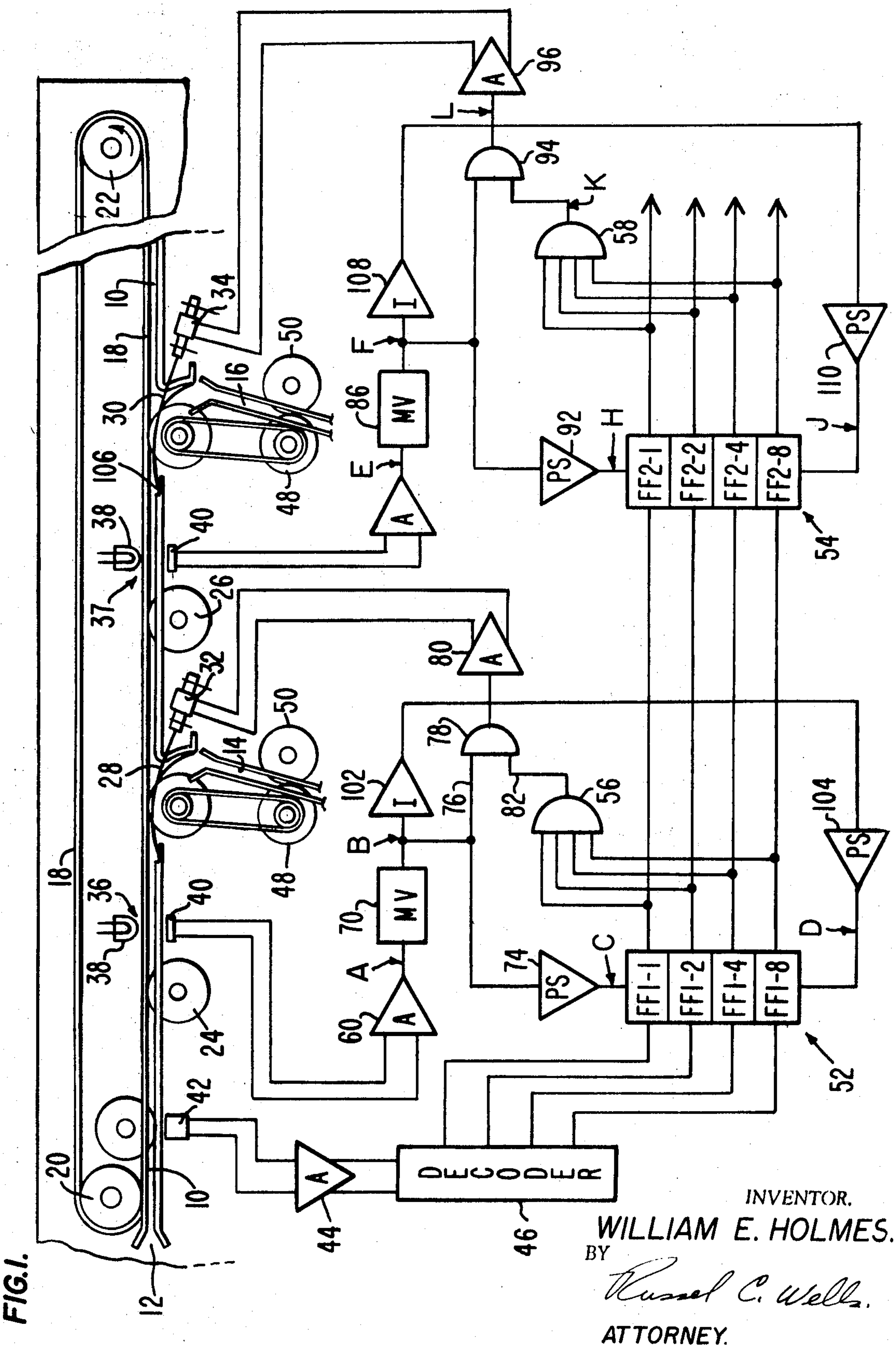
FIG. 1 is a schematic diagram illustrating the system organization of the invention.

Referring to FIG. 1, there is shown by diagrammatic representation a document transport system having the main transport guideway 10 extending from an inlet 12 to a plurality of auxiliary guideways 14 and 16. A document, such as a check, is inserted into the transport system at the inlet 12 where it is conveyed by an endless belt 18 extending from a driven roller 20 at the inlet 12 of the main transport guideway 10 to a drive roller 22 at the opposite end of the main transport guideway. A plurality of idler rollers 24 and 26 are spaced along the belt to hold the document against the endless belt 18 as the document is being transported from the inlet 12 to its destination.

In FIG. 1, two of the plurality of spaced apart auxiliary guideways 14 and 16 are shown intersecting the main transport guideway 10. Positioned at the junction of the main transport guideway 10 and each auxiliary guideway 14 and 16 is a document deflecting or diverting gate 28 and 30 controlled by a solenoid 32 and 34. A document detector 36 and 37 is anteriorly positioned with respect to the direction of document travel to each auxiliary guideway 14 and 16. Each document detector 36 and 37 is respectively operatively connected electrically to a deflection gate 28 or 30. Each document detector comprises a cell excitor 38 or lamp on one side of the guideway and a solar cell 40 directly opposite on the other side of the guideway. As a document is conveyed between the lamp 38 and the solar cell 40 by the endless belt 18, a signal is generated by the solar cell indicating the presence of the document at the point. Other forms of document detectors may be used such as reflected light detectors wherein both the cell excitor and the cell are on the same side of the guideway.

Positioned adjacent to the inlet 12 is a document reader 42 which in the preferred embodiment is a magnetic read head to read information on the document indicative of the destination of the document. The information read by the reader 42 is supplied to the electrical system shown in FIG. 1, which comprises the reader circuit and a control circuit for each auxiliary guideway 14 and 16. The information storage element or register in each control circuit is serially connected to the information storage element or register in preceding control circuit in a manner as will hereinafter be described.

The reader circuit is electrically connected to the magnetic read head 42 and comprises an amplifier 44 and a decoder network 46. The magnetic read head 42 generates a plurality of signals in response to the magnetically encoded characters on the passing document. These signals are amplified in the amplifier 44 and then decoded into binary valued signals in the decoder 46. The output from the decoder 46 representing the destination information of the document, is electrically connected to the first register 52 in the control circuitry for the first auxiliary guideway 14. As will be hereinafter shown, the registers are responsive to the information on the document indicative of the identification of one of the deflection gates.

The function of each auxiliary guideway control circuit is to synchronize the electrical flow of information with the physical movement of a document along the main transport guideway 10. At each document detector 36 and 37 position, the destination information is electrically passed from the preceding control circuit corresponding to the next succeeding auxiliary guideway. The received information is verified with the guideway identification and if verification occurs, the solenoid 32 or 34 controlling the deflection gate 28 or 30 is actuated and the document is then deflected from the main transport guideway 10 into the auxiliary guideway 14 or 16. As shown in FIG. 1, a drive roller 48 and a corresponding idler roller 50 are positioned along the auxiliary guideway 14 or 16 to move the document therealong.

If there is no verification, the document is transported by the endless belt 18 to the next document detector 37 where the previously mentioned procedure regarding the destination information is followed. It is to be noted that as a byproduct of the present system several control signals may be developed which would be useful to the overall data processing activity of which the present invention is a part. One such control signal could be a wrong destination signal which would indicate that the document was incorrectly deflected from the main transport guideway. Such a signal could be generated from the combination of electrical signals indicating that the document has not been transported to the adjacent detector within a given period of time after leaving the previous detector.

OPERATION

The operation of the document transport system can best be described by reference to FIG. 1 and the timing diagrams FIG. 2 through FIG. 11 showing the signals present at the several points of FIG. 1 for two successive documents. For the purpose of explanation, the first document will be deflected in the second auxiliary guideway 16 from the reader 42 as shown in FIG. 1. The second document at this time will be at or near the first detector.

In the schematic portion of FIG. 1, the two registers 52 and 54 each comprise four negative trigger flip-flops. All of the logic gates, including the verifier 56 and 58, are positive AND gates thus, for an output signal from a gate to be true, all of the input signals must be true. Also shown are inverters, I, which provide an output signal which is the inversion of the input signal; pulse standardizers, PS, which are positive triggered devices and generate a single discrete pulse for each triggered input; and a multivibrator, MV, which times out a predetermined interval after the input signals are electrically removed. In the preferred embodiment, the voltage level for a "true" signal is +5 volts and the voltage level for a "false" signal is ground.

The several amplifiers, A, shown in FIG. 1 function to amplify the small input signal into an electrically larger output signal having the capability to perform the required circuit function. The decoder is a network of logic elements adapted to transpose the amplified input signal from the reader into four discrete output signals representing the binary signals of one, two, four and eight.

Each of the verifiers 56 or 58 which are illustrated as four-input AND gates, are electrically connected to their respective registers 52 and 54 to correspond to the numerical identification of the corresponding deflecting gate 28 or 30. Thus the first verifier 56 in FIG. 1 is electrically connected to the first register 52 according to the following equation:

Verifier (56)→FF−1·FFL−2/·FF1−4/·FF−8/ where

FF1−1 is the one output of the binary one flip-flop in register one;

FF1−2/ ·FF1−4/, FF1−8/, are the zero outputs of the binary two, four, and eight flip-flop respectively in register one.

In a similar manner, the second verifier 58 is electrically connected to the second register 54.

As a document passes the reader 42, the magnetic read head reads the destination information thereon. For the purposes of illustration, this information indicates the second auxiliary guideway 16 as the destination. The signals from the magnetic read head 42 are amplified in the amplifier 44 and decoded in the decoder 46 so that the binary two output level from the decoder 46 is true and the binary one, four and eight levels are false.

As the document is conveyed along the main guideway 10 by the endless belt 18, it interrupts the light beam between the first excitor 38 and solar cell 40 which comprise the first document detector 36. The output signal from the solar cell 40 is amplified in the amplifier 60 and is illustrated in FIG. 2 by the voltage waveshape 62 labeled point A. The positive going signal 64 at point A represents the leading edge of the document and the negative going signal 66 represents the trailing edge of the document. The time period 68 between these two signals, which is at a +5 voltage level is proportional to the length of the document.

The multivibrator 70 generates a signal output which is substantially coincident with the leading edge of the document and is labeled in FIG. 3 as point B. The positive going signal 72 triggers the pulse standardizer 74, PS, shown as point C, which transfers the information from the decoder 46 into the several flip-flops of the first register 52. The output of the multivibrator 70 also conditions one input 76 of two-input AND gate 78 which controls the amplifier 80 for the deflecting gate solenoid 32.

Since the destination information which was read from the document indicates the second auxiliary guideway 16, the true outputs of the first register 52 are FF1−1/, FF1−2, FF1−4/ and FF1−8/. With these signals the output of the first verifier 56 is false as shown by the previous equation. The second input 82 of AND gate 78 controlling the amplifier 80 for the deflecting gate solenoid 32 is false, therefore the output of the amplifier 80 does not energize the solenoid. The first deflecting gate 28 remains closed and the document is conveyed past the auxiliary guideway 14.

As the trailing edge of the document leaves the first detector 36, the input to the multivibrator 70 goes false and the predetermined timing of the multivibrator is initiated. This is illustrated in FIG. 2 and FIG. 3 by the difference in the length of the signals at points A and B.

The leading edge of the document next passes between the cell excitor 38 and solar cell 40 of second detector 37. This generates a positive going signal 84 at point E as shown in FIG. 6. The second multivibrator 86 is triggered providing an output waveshape 88 as shown at point F. The positive going signal 90 at point F triggers the pulse standardizer 92 to transfer the destination information of the document from the first register 52 to the second register 54. Thus the destination information is electrically synchronized with the position of the document in the main transport guideway 10.

The function of the multivibrators 70 or 86 is threefold. First to delay the electrical effect of the trailing edge of document passing the document detector 36 or 37 a sufficient length of time to allow the leading edge of the document to reach the next adjacent document detector 37. Second, the multivibrator provides a longer signal to hold the deflecting gate solenoid 32 or 34 energized until the trailing edge of the document has been transferred into the auxiliary guideway 14 or 16 as will be shown. Third, the negative going signal from the multivibrator is inverted by the inverter to trigger the second pulse standardizer which clears the preceding register.

In the present illustration, the document has reached the second document detector 37 transferring the destination information into the second register 54 by the operation of the pulse 91 from the pulse standardizer 92 at point H. At this point in time both the first register 52 and the second register 54 contain the same information.

The second verifier 58 is electrically connected to the second register 54 according to the following equation:

Verifier (58) → FF2−1/ · FF2−2 · FF2−4/ · FF2−8/.

Therefore, since the destination information is two, the output signal 93 of the second verifier 58 at point K becomes true. This enables the gate 94 controlling the amplifier 96 for the deflection gate solenoid 34. This waveshape 98 corresponds to point L in FIG. 11. The solenoid 34 is energized causing the deflection gate 30 to open deflecting the document from the main transport guideway 10 into the second auxiliary guideway 16.

Sometime after the leading edge of the document passes the second document detector 37, the first multivibrator 70 times out causing the signal at point B to go negative 100. This signal is inverted by the inverter 102 and triggers the second pulse standardizer 104 generating a pulse 105 at point D which clears the first register 52. The first register 52 is now ready to receive destination information relative to the next document. As illustrated in FIG. 2 by the second waveshape 62 at point A, the next document is at the first detector 36 while the first document is at the second detector 37 for maximum transport rate of documents.

The deflecting gate solenoid 34 controlling the second deflecting gate 30 remains energized until the second multivibrator 86 times out. At this time the document is being driven by the two drive rollers 48 and 50 associated with the auxiliary guideway 16 and the trailing edge of the document has passed the free end of the deflecting gate 106. Also at this time the inverter 108 goes true triggering the pulse standardizer 110 to clear the second register 54 which is illustrated by the waveshape 112 at point J.

Thus, a system is shown and described for singly transporting a plurality of documents along a single guideway to an auxiliary guideway. The destination information is read from the document and is electrically transferred through a plurality of serially connected registers in synchronism with the movement of the document along the guideway. Each register corresponds to a single unique auxiliary guideway having its contents verified with the guideway identification. If there is a verification, the document is deflected from the main transport guideway to the auxiliary guideway. If there is no verification then the destination information is transferred to the next auxiliary guideway register. Since the destination information is synchronously transferred with the movement of its corresponding document, a plurality of documents, each going to a different auxiliary guideway may be transported by the main guideway at any one time. There is no requirement as to order of destination of the documents and a random order is efficiently controlled.

I claim:

1. In a high-speed document transport system for transporting documents to one of a plurality of auxiliary guideways, a document control system to select a predetermined auxiliary guideway, said document control system comprising:

a document transport guideway extending from an inlet end to a termination end to singly and successively transport documents;

a plurality of identifiable spaced-apart intersecting guideways intersecting said document transport guideway;

deflection means positioned at each intersection to deflect a document from the document transport guideway to an intersecting guideway; 1 reading means posteriorly disposed from said inlet and operatively connected to said document transport guideway to dynamically read the encoded destination information on the documents passing thereby;

detection means anteriorly positioned with respect to document travel to said deflecting means respectively, said detection means operatively connected to said transport guideway to detect a document passing thereby;

a first register operably connected to said reading means and the first of said detection means to receive from the reading means to the encoded destination information;

a plurality of second register means respectively electrically connected to a different one of said detection means and connected in electrical series with said first register means to receive the destination information from said first register means in response to said detection means;

a verifier responsive to one of said detection means and electrically connected to said register means to activate said deflection means upon verification between the encoded destination information and said intersecting guideway means; and timing means electrically connected to said first and second register means, respectively, said timing means responsive to detection means associated with said register means to generate an electrical signal to clear said register means of said destination information a predetermined time after receipt thereof.

2. In a document transport system according to claim 1 wherein said timing means is a multivibrator having a predetermined time equal to the normal time it takes a document to travel between adjacent detection means.

3. In a document transport system according to claim 1 wherein said timing means is a multivibrator having a predetermined time equal to the normal time it takes a document to travel from said detection means along said guideway to be positioned wholly within said intersecting guideway adjacent to said detection means in response to said verifier.